US011898509B2

(12) United States Patent
Ando et al.

(10) Patent No.: US 11,898,509 B2
(45) Date of Patent: Feb. 13, 2024

(54) EGR ESTIMATION METHOD FOR INTERNAL COMBUSTION ENGINE AND EGR ESTIMATION DEVICE FOR INTERNAL COMBUSTION ENGINE

(71) Applicant: NISSAN MOTOR CO., LTD., Yokohama (JP)

(72) Inventors: Taichi Ando, Kanagawa (JP); Kenji Suzuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/916,326

(22) PCT Filed: Apr. 2, 2020

(86) PCT No.: PCT/JP2020/015230
§ 371 (c)(1),
(2) Date: Sep. 30, 2022

(87) PCT Pub. No.: WO2021/199411
PCT Pub. Date: Oct. 7, 2021

(65) Prior Publication Data
US 2023/0151775 A1  May 18, 2023

(51) Int. Cl.
*F02D 41/00* (2006.01)
*F02M 26/49* (2016.01)

(52) U.S. Cl.
CPC ....... *F02D 41/0072* (2013.01); *F02D 41/005* (2013.01); *F02M 26/49* (2016.02)

(58) Field of Classification Search
CPC .. F02D 41/0072; F02D 41/005; F02D 41/123; F02M 26/49; F02M 26/06; F02M 26/47; Y02T 10/40
See application file for complete search history.

(56) References Cited

U.S. PATENT DOCUMENTS

| 2011/0139134 A1* | 6/2011 | Elsasser ................. F02M 26/06 123/568.18 |
| 2013/0206118 A1 | 8/2013 | Yoshikawa et al. |
| 2015/0211447 A1 | 7/2015 | Takaki |

(Continued)

FOREIGN PATENT DOCUMENTS

| JP | H04-284147 A | 10/1992 |
| JP | 2005-325811 A | 11/2005 |

(Continued)

*Primary Examiner* — Joseph J Dallo
(74) *Attorney, Agent, or Firm* — Foley & Lardner LLP

(57) ABSTRACT

An EGR estimation method for an internal combustion engine 1 estimates an EGR rate in an intake and exhaust system 10, 20 of an internal combustion engine, the intake and exhaust system 10, 20 of an internal combustion engine including an intake system 10, an exhaust system 20, and an EGR device 40, the EGR device 40 includes an EGR passage 41 and an EGR valve 43. The EGR estimation method includes determining a gas replacement state by exhaust gas and fresh air in an upstream EGR passage, which is a portion of the EGR passage between the EGR valve and the exhaust passage, when fuel cut of the internal combustion engine is started and the EGR valve is fully closed; and estimating the EGR rate based on a result of the determination.

8 Claims, 6 Drawing Sheets

(56) References Cited

U.S. PATENT DOCUMENTS

| | | | |
|---|---|---|---|
| 2017/0282901 A1* | 10/2017 | Imamura | B60W 10/06 |
| 2018/0363576 A1* | 12/2018 | Nakamura | F02D 41/18 |
| 2019/0093529 A1* | 3/2019 | Katsuta | F01N 3/103 |
| 2019/0101065 A1* | 4/2019 | Aoyagi | F02D 41/0065 |
| 2019/0195176 A1* | 6/2019 | Nagakura | F02M 26/42 |

FOREIGN PATENT DOCUMENTS

| | | | | |
|---|---|---|---|---|
| JP | 2010-096001 A | | 4/2010 | |
| JP | 2013249774 A | * | 12/2013 | F02D 41/005 |
| JP | 2015218642 A | * | 12/2015 | F02D 41/0077 |
| JP | 2016-211456 A | | 12/2016 | |
| WO | WO-2014/020982 A1 | | 2/2014 | |

* cited by examiner

EGR ESTIMATION METHOD FOR INTERNAL COMBUSTION ENGINE AND EGR ESTIMATION DEVICE FOR INTERNAL COMBUSTION ENGINE

TECHNICAL FIELD

The present invention relates to EGR estimation of an internal combustion engine.

BACKGROUND ART

JP2016-211456A discloses a technique in which when an exhaust gas accumulation amount of exhaust gas leaked into a downstream EGR passage when an EGR valve is fully closed exceeds a predetermined threshold value, fresh air introduction control is performed to introduce fresh air into the downstream EGR passage.

SUMMARY OF INVENTION

Even if the EGR valve is fully closed, a gap may occur due to a structure thereof. In this case, even if fuel cut of an internal combustion engine is started when the EGR valve is fully closed, the exhaust gas may leak from the EGR valve to an intake passage side through the gap. As a result, an inside of an upstream EGR passage, that is, a portion between the EGR valve and an exhaust passage, is replaced with fresh air from an upstream side according to the leakage of the exhaust gas during the fuel cut.

In this case, even if the EGR valve is opened by restarting EGR after fuel injection of the internal combustion engine is restarted, the fresh air remaining in the upstream EGR passage first flows into the EGR valve. As a result, the EGR gas, which is the exhaust gas recirculated, may not reach the EGR valve immediately. Therefore, in light of such a flow mode of the gas, it is desired to estimate a more accurate EGR rate when the fuel cut is started when the EGR valve is fully closed.

The present invention is made in view of such a problem, and an object of the present invention is to estimate a more accurate EGR rate when the fuel cut is started when the EGR valve is fully closed.

An EGR estimation method for internal combustion engines according to one embodiment of this invention is an EGR estimation method for an internal combustion engine that estimates an EGR rate in an intake and exhaust system of an internal combustion engine, the intake and exhaust system of an internal combustion engine including: an intake system including an intake passage that is connected to an internal combustion engine, an exhaust system including an exhaust passage that is connected to the internal combustion engine, and the intake and exhaust system being provided with an EGR device including an EGR passage that connects the intake passage and the exhaust passage and an EGR valve that is provided in the EGR passage, the EGR estimation method comprising: determining a gas replacement state by exhaust gas and fresh air in an upstream EGR passage, which is a portion of the EGR passage between the EGR valve and the exhaust passage, when fuel cut of the internal combustion engine is started and the EGR valve is fully closed; and estimating the EGR rate based on a result of the determination.

According to another embodiment of the invention, there is provided an EGR estimation device for internal combustion engines corresponding to the above EGR estimation method for an internal combustion engine.

DESCRIPTION OF EMBODIMENTS

Hereinafter, an embodiment of the present invention will be described with reference to the accompanying drawings.

Figure 1:
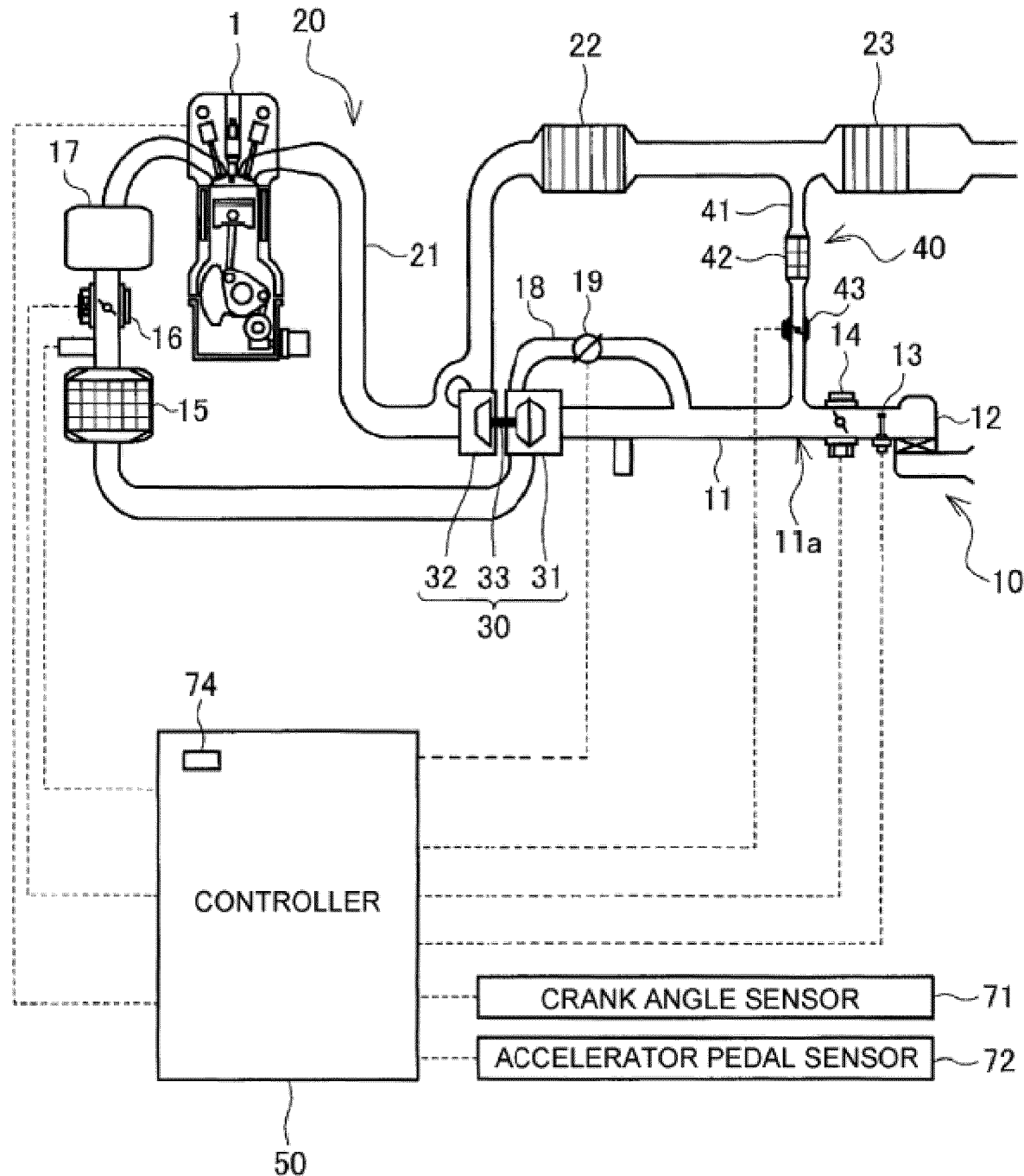
FIG. 1 is a schematic configuration diagram showing a main part of a vehicle.

FIG. 1 is a diagram showing a main part of a vehicle. The vehicle includes an internal combustion engine 1, an intake system 10, an exhaust system 20, a supercharger 30, an EGR device 40, and a controller 50.

The intake system 10 includes an intake passage 11, an air cleaner 12, an air flow meter 13, an intake throttle valve 14, an intercooler 15, a throttle valve 16, a collector 17, a compressor 31, an intake bypass passage 18, and a recirculation valve 19. The intake passage 11 connects the air cleaner 12 and the internal combustion engine 1 and circulates intake air introduced into the internal combustion engine 1. The intake passage 11 is provided with the air cleaner 12, the air flow meter 13, the intake throttle valve 14, the compressor 31, the intercooler 15, the throttle valve 16, and the collector 17 in this order from an upstream side.

The air cleaner 12 removes foreign matters contained in the intake air. The air flow meter 13 measures a flow rate of the intake air. The intake throttle valve 14 is provided in a portion of the intake passage 11, which is on an upstream side of an EGR convergence portion 11a to which an EGR passage 41 is connected, which will be described later. The intake throttle valve 14 increases a recirculation amount of exhaust gas through the EGR passage 41 by reducing an opening degree.

The intercooler 15 cools the supercharged intake air. The throttle valve 16 adjusts an amount of the intake air introduced into the internal combustion engine 1. The collector 17 temporarily stores the intake air. The compressor 31 is a compressor of the supercharger 30 and compresses the intake air.

The exhaust system 20 includes an exhaust passage 21, an upstream catalyst 22, a downstream catalyst 23, and a turbine 32. The exhaust passage 21 is connected to the internal combustion engine 1 and circulates exhaust gas discharged from the internal combustion engine 1. The exhaust passage 21 is provided with the turbine 32, the upstream catalyst 22, and the downstream catalyst 23 in this order from an upstream side. The upstream catalyst 22 and the downstream catalyst 23 purify the exhaust gas. The turbine 32 is the turbine of the supercharger 30 and recovers energy from the exhaust gas.

The supercharger 30 compresses the intake air and then supplies to the internal combustion engine 1. The supercharger 30 is a turbocharger and includes the compressor 31, the turbine 32, and a shaft 33. The supercharger 30 is provided in the intake passage 11 and the exhaust passage 21 by providing the compressor 31 in the intake passage 11 and the turbine 32 in the exhaust passage 21. In the supercharger 30, when the turbine 32 is rotated by the exhaust gas, the compressor 31 is rotated via the shaft 33 to compress the intake air. In the compressor 31, a pair of compressor wheels arranged in a back-to-back direction are provided on the shaft 33, and the intake air is compressed by the pair of compressor wheels. The turbine 32 is provided with an exhaust bypass passage, and the exhaust bypass passage is provided with a waste gate valve (not shown) that adjusts a flow rate of the flowing exhaust gas.

The EGR device 40 includes the EGR passage 41, an EGR cooler 42, and an EGR valve 43. The EGR device 40 recirculates the exhaust gas from the exhaust passage 21 to the intake passage 11.

The EGR passage 41 connects the exhaust passage 21 and the intake passage 11. The EGR passage 41 recirculates a part of the exhaust gas flowing through the exhaust passage 21 to the intake passage 11 as EGR gas. The EGR passage 41 is provided with the EGR cooler 42 and the EGR valve 43. The EGR cooler 42 cools the EGR gas flowing through the EGR passage 41. The EGR valve 43 adjusts a flow rate of the EGR gas flowing through the EGR passage 41. The EGR valve 43 includes, for example, a butterfly valve.

The EGR passage 41 includes an upstream EGR passage 41a, which is a portion between the EGR valve 43 and the exhaust passage 21, and a downstream EGR passage 41b, which is a portion between the EGR valve 43 and the intake passage 11. It can be understood that the upstream EGR passage 41a includes the EGR cooler 42.

The EGR device 40, specifically, the EGR passage 41 connects a portion downstream of the supercharger 30, that is, the turbine 32 in the exhaust passage 21, and a portion upstream of the supercharger 30, that is, the compressor 31 in the intake passage 11. In this way, the EGR passage 41 connecting the intake passage 11 and the exhaust passage 21 forms an EGR path of a low pressure loop, that is, an LPL. More specifically, the EGR passage 41 connects a portion of the exhaust passage 21 between the upstream catalyst 22 and the downstream catalyst 23 and a portion of the intake passage 11 between the intake throttle valve 14 and the compressor 31.

The intake bypass passage 18 connects an upstream pressure portion and a downstream pressure portion of the supercharger 30 in the intake system 10. The upstream pressure portion is a portion of the intake passage 11 on an upstream side of the supercharger 30 and on a downstream side of the EGR convergence portion 11a. The downstream pressure portion is a portion of the intake passage 11 on a downstream side of the supercharger 30 and on an upstream side of the intercooler 15. Connecting to the downstream pressure portion of the supercharger 30 in the intake system 10 includes connecting to the compressor 31 so that the compressed intake air can flow into the intake bypass passage 18.

The recirculation valve 19 is provided in the intake bypass passage 18. The recirculation valve 19 includes an on-off valve. During supercharging, a downstream pressure of the supercharger 30 is higher than an upstream pressure thereof.

Therefore, when the recirculation valve 19 is opened during the supercharging, the intake air compressed by the compressor 31 is returned to the intake passage 11 on the portion upstream of the supercharger 30 via the intake bypass passage 18.

The controller 50 is an electronic control device, and in addition to the air flow meter 13, signals from various sensors and switches such as a crank angle sensor 71 and an accelerator position sensor 72 are input to the controller 50. The crank angle sensor 71 generates a crank angle signal for each predetermined crank angle. The crank angle signal is used as a signal representing a rotation speed NE of the internal combustion engine 1. The accelerator position sensor 72 detects an amount of depression of an accelerator pedal of the vehicle. The amount of depression of the accelerator pedal is used as a signal representing a load of the internal combustion engine 1.

The controller 50 controls the intake throttle valve 14, the throttle valve 16, the recirculation valve 19, and the EGR valve 43 in addition to the internal combustion engine 1 based on the above input signals from the various sensors and switches. The controller 50 controls the internal combustion engine 1 by controlling an ignition timing and a fuel injection amount according to an engine operating state. The engine operating state is, for example, the rotation speed NE or the load.

Even if the EGR valve 43 is fully closed, a gap may occur due to a structure thereof. In this case, even if fuel cut of the internal combustion engine 1 is started when the EGR valve 43 is fully closed, the exhaust gas may leak from the EGR valve 43 to the intake passage 11 side through the gap. As a result, an inside of the upstream EGR passage 41a is replaced with fresh air from an upstream side according to the leakage of the exhaust gas during the fuel cut.

In this case, even if the EGR valve 43 is opened by restarting EGR after fuel injection of the internal combustion engine 1 is restarted, the fresh air remaining in the upstream EGR passage 41a first flows into the EGR valve 43. As a result, the EGR gas may not reach the EGR valve 43 immediately. Such a flow mode of the gas is described in detail as follows.

Figure 2A:
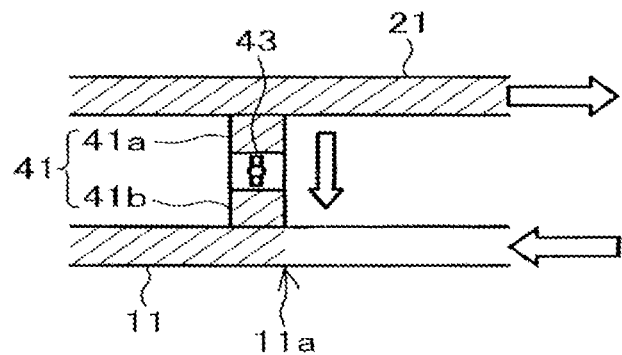
FIG. 2A is a first diagram for explaining a flow mode of gas.

FIGS. 2A to 2E are diagrams for explaining the flow mode of the gas. FIG. 2A shows a state during EGR operation. At this time, the exhaust gas is recirculated from the exhaust passage 21 to the intake passage 11. Therefore, as shown by hatching, the exhaust gas or the mixed gas of the exhaust gas and the intake gas flows through the exhaust passage 21, the EGR passage 41, and a portion of the intake passage 11 downstream of the EGR convergence portion 11a.

Figure 2B:
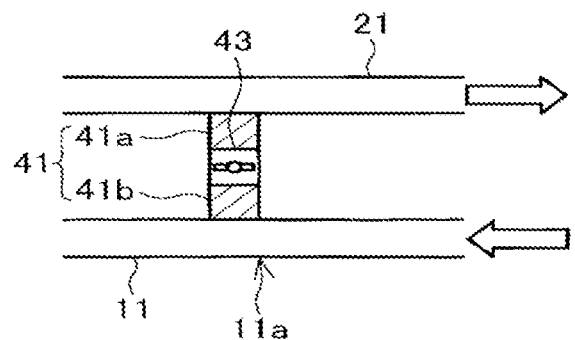
FIG. 2B is a second diagram for explaining the flow mode of the gas.

FIG. 2B shows a state at a start of the fuel cut. The fuel cut is started when the EGR valve 43 is fully closed. As a result, the fresh air flows through the intake passage 11 and the exhaust passage 21. In this case, the exhaust gas is left in the EGR passage 41.

Figure 2C:
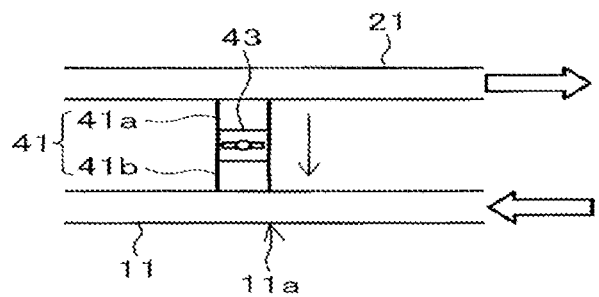
FIG. 2C is a third diagram for explaining the flow mode of the gas.

FIG. 2C shows a state during the fuel cut. During the fuel cut, the exhaust gas leaks from the EGR valve 43 to the intake passage 11 side through the gap. As a result, the exhaust gas is replaced with the fresh air in the upstream EGR passage 41a, and in this case, finally, the entire EGR passage 41 is filled with the fresh air.

Figure 2D:
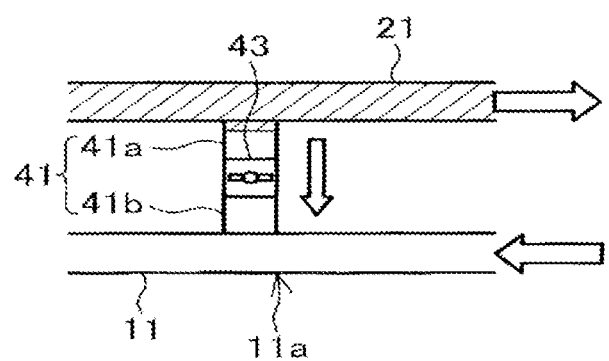
FIG. 2D is a fourth diagram for explaining the flow mode of the gas.

FIG. 2D shows a state after the fuel injection is restarted and before the EGR valve 43 is opened. After the fuel injection is restarted, the fresh air flows through the intake passage 11 and the exhaust gas flows through the exhaust passage 21. After the fuel injection is restarted and before the EGR valve 43 is opened, the fresh air leaks through the gap of the EGR valve 43. Therefore, the exhaust gas is filled in the upstream EGR passage 41a by an amount of the fresh air leaking. The exhaust gas is gradually filled from an upstream portion of the upstream EGR passage 41a.

Figure 2E:
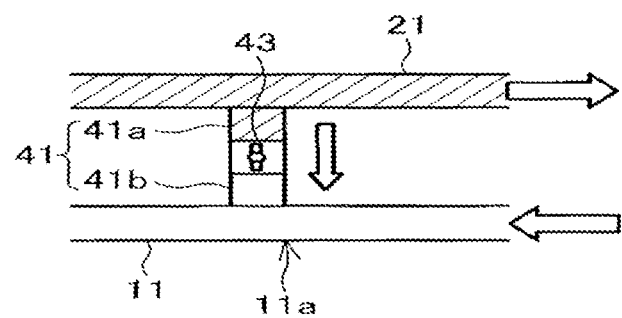
FIG. 2E is a fifth diagram for explaining the flow mode of the gas.

FIG. 2E shows a state in which the upstream EGR passage 41a is filled with the exhaust gas after the EGR valve 43 is opened. When the EGR valve 43 is opened, the fresh air remaining in the upstream EGR passage 41a first flows into the EGR valve 43, and then the exhaust gas flows into the EGR valve 43.

Therefore, immediately after the EGR valve 43 is opened, the EGR rate in the EGR valve 43 remains zero. The EGR rate then begins to rise after the upstream EGR passage 41a is filled with the exhaust gas as shown in FIG. 4E.

In light of such a flow mode of the gas, in the present embodiment, the EGR rate (actual EGR rate) in the EGR valve 43 is estimated as described below.

Figure 3:
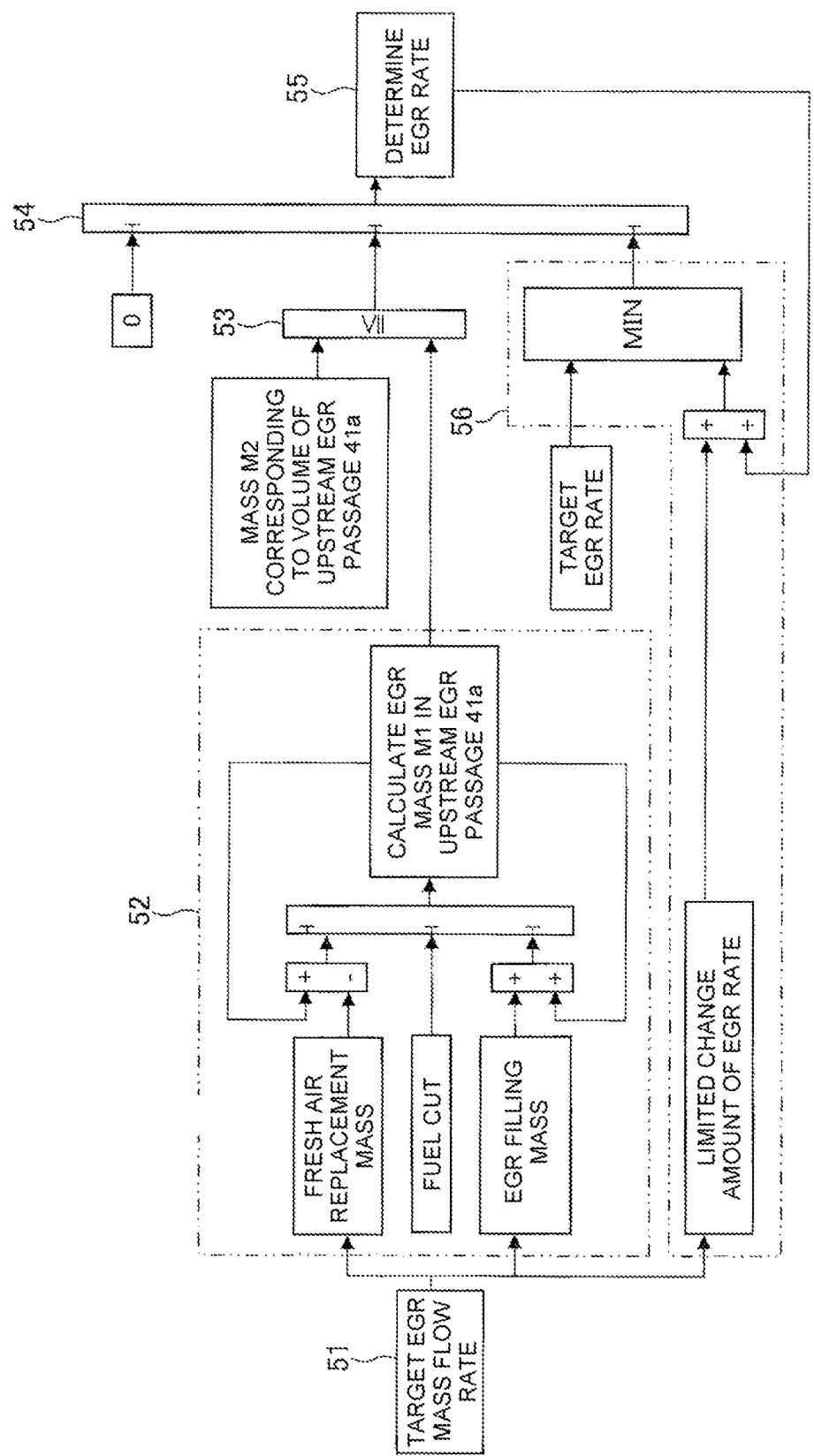
FIG. 3 is a control block diagram showing an EGR rate estimation process.

FIG. 3 is a control block diagram showing an EGR rate estimation process performed by the controller 50. A target EGR mass flow rate calculation unit 51 calculates a target EGR mass flow rate. The target EGR mass flow rate is a mass flow rate of the EGR gas according to a target EGR rate in the upstream EGR passage 41a, and is set in advance according to an engine operating state. The target EGR mass flow rate indicates a flow rate of the EGR gas flowing through the upstream EGR passage 41a according to a valve opening state of the EGR valve 43.

An EGR mass calculation unit 52 calculates an EGR mass M1. The EGR mass M1 is a mass of the EGR gas in the upstream EGR passage 41a, and becomes an EGR mass M2 corresponding to a volume of the upstream EGR passage 41a when the upstream EGR passage 41a is filled with the exhaust gas. The EGR mass M1 is calculated as follows.

During the fuel cut, the exhaust gas is replaced with the fresh air in the upstream EGR passage 41a as described above with reference to FIG. 2C. In this case, the EGR mass calculation unit 52 subtracts a fresh air replacement mass (an EGR mass corresponding to the fresh air replacement) from the EGR mass M1 for each JOB period of the EGR rate estimation process, thereby calculating the EGR mass M1. That is, a new EGR mass M1 is calculated by subtracting the fresh air replacement mass from the latest value of the EGR mass M1.

The fresh air replacement mass is a mass of the exhaust gas newly replaced by the fresh air in the upstream EGR passage 41a, and is set based on the target EGR mass flow rate and the gap of the EGR valve 43. However, the EGR is stopped during the fuel cut, and the target EGR mass flow rate becomes zero. Therefore, the fresh air replacement mass can be set in advance based on the gap of the EGR valve 43 on the premise that the engine operating state is in the fuel cut. In this case, it can be understood that it is premised that the fuel is being cut based on the target EGR mass flow rate.

When the fuel cut is stopped and the fuel injection is restarted, the EGR mass calculation unit 52 adds an EGR filling mass to the EGR mass M1 for each JOB period of the EGR rate estimation process, thereby calculating the EGR mass M1. That is, a new EGR mass M1 is calculated by adding the EGR filling mass to the latest value of the EGR mass M1.

The EGR filling mass is a mass of the exhaust gas newly filled in the upstream EGR passage 41a, and is set based on at least the target EGR mass flow rate between the target EGR mass flow rate and the gap of the EGR valve 43. The EGR filling mass is set to different values after the fuel injection is restarted when the target EGR mass flow rate is zero and when it is not zero, that is, before and after the EGR is restarted.

After the fuel injection is restarted and before the EGR is restarted, the EGR filling mass is a value set in advance based on the gap of the EGR valve 43, similarly to the fresh air replacement mass. When the EGR is restarted, the EGR filling mass is set based on the target EGR mass flow rate. The EGR filling mass will be further described later. The EGR mass M1 calculated by the EGR mass calculation unit 52 is input to a determination unit 53.

The determination unit 53 determines whether the EGR mass M2 corresponding to the volume of the upstream EGR passage 41a is equal to or less than the EGR mass M1 (whether the EGR mass M1 is equal to or more than the EGR mass M2). The EGR mass M2 is a determination value for determining whether the upstream EGR passage 41a is filled with the exhaust gas, and if an affirmative determination is made, it is determined that the upstream EGR passage 41a is filled with the exhaust gas. In this case, a signal is input from the determination unit 53 to a selection unit 54.

The selection unit 54 selects an estimated EGR rate as the EGR rate in the EGR valve 43. As described above with reference to FIG. 2E, immediately after the EGR valve 43 is opened after the fuel injection is restarted, fresh air is introduced into the EGR valve 43 from the upstream EGR passage 41a, so that the EGR rate remains zero.

Therefore, the selection unit 54 selects zero when no signal is input from the determination unit 53, that is, when the upstream EGR passage 41a is not filled with the exhaust gas. The selected EGR rate is input to an EGR rate determination unit 55.

The EGR rate determination unit 55 determines the EGR rate input from the selection unit 54 as the EGR rate in the EGR valve 43. In this way, the estimated EGR rate is determined. The determined EGR rate is input to a change amount limiting unit 56.

The change amount limiting unit 56 limits a change amount of the EGR rate. The change amount limiting unit 56 calculates a limited change amount of the EGR rate based on the target EGR mass flow rate, and the calculated limited change amount is added to the EGR rate input from the EGR rate determination unit 55. In this way, a limited EGR rate is calculated in which a change amount from the latest estimated EGR rate is the limited change amount. The limited change amount will be further described later.

The change amount limiting unit 56 further selects the smaller EGR rate from the calculated limited EGR rate and the target EGR rate. As a result, the limited EGR rate is selected when the limited EGR rate is smaller than the target EGR rate, and the target EGR rate is not used. When the limited EGR rate and the target EGR rate are the same, either one may be selected. The selected EGR rate is input to the selection unit 54.

As described above with reference to FIG. 2E, the EGR rate in the EGR valve 43 begins to rise after the upstream EGR passage 41a is filled with the exhaust gas. Therefore, when the signal from the determination unit 53 is input, that is, when the upstream EGR passage 41a is filled with the exhaust gas, the selection unit 54 does not select zero and selects the EGR rate input from the change amount limiting unit 56.

As a result, when the upstream EGR passage 41a is filled with the exhaust gas and the limited EGR rate is lower than the target EGR rate, the selection unit 54 selects the limited EGR rate that gradually increases from zero by an amount of the limited change amount. When the limited EGR rate exceeds the target EGR rate, the target EGR rate input from the change amount limiting unit 56 is selected.

Figure 4:
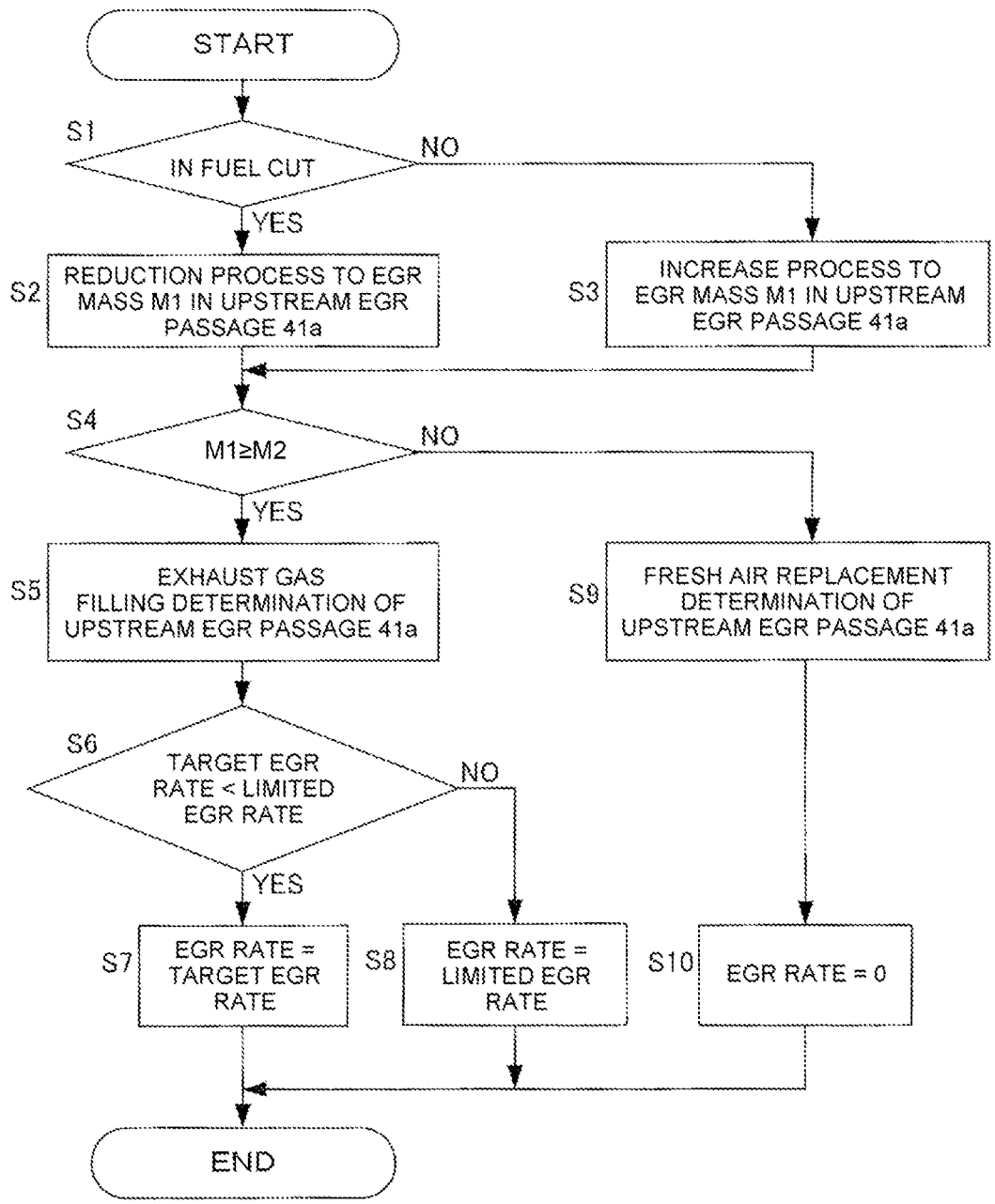
FIG. 4 is a flowchart showing the EGR rate estimation process.

FIG. 4 is a flowchart showing the EGR rate estimation process performed by the controller 50. The controller 50 includes a determination control unit and an estimation control unit by being programmed to execute the process shown in this flowchart.

In step S1, the controller 50 determines whether the fuel is being cut. Whether the fuel is being cut can be determined by whether a predetermined fuel cut execution condition is satisfied. If an affirmative determination is made in step S1, the process proceeds to step S2.

In step S2, the controller 50 performs a reduction process to the EGR mass M1 in the upstream EGR passage 41a. The reduction process to the EGR mass M1 is a process for reducing the EGR mass M1 by the above fresh air replacement mass, and since the exhaust gas is replaced with the fresh air in the upstream EGR passage 41a during the fuel cut, the EGR mass M1 is reduced. After step S2, the process proceeds to step S4.

In step S4, the controller 50 determines whether the EGR mass M1 is equal to or greater than the EGR mass M2. If an affirmative determination is made in step S4, it is determined that the upstream EGR passage 41a is filled with the exhaust gas. When the process proceeds from step S2 to step S4, since the upstream EGR passage 41a is not filled with the exhaust gas, a negative determination is made, and the process proceeds to step S9.

In step S9, the controller 50 makes a fresh air replacement determination. The fresh air replacement determination is a determination that the upstream EGR passage 41a is being replaced with the fresh air, in other words, a determination that the upstream EGR passage 41a is not filled with the exhaust gas. After step S9, the process proceeds to step S10.

In step S10, the controller 50 determines the EGR rate in the EGR valve 43 to zero. As a result, when the upstream EGR passage 41a is not filled with the exhaust gas, the EGR rate in the EGR valve 43 is estimated to be zero. After step S10, the process ends temporarily.

In a subsequent routine, the same process is repeated during the fuel cut, and the EGR rate is estimated to be zero. In this case, the EGR mass M1 is reduced in step S2 according to an execution time of the fuel cut. Then, when the fuel injection is restarted and the fuel is not being cut, a negative determination is made in step S1, and the process proceeds to step S3.

In step S3, the controller 50 performs an increase process to the EGR mass M1 in the upstream EGR passage 41a. The increase process to the EGR mass M1 is a process for increasing the EGR mass M1 by the above EGR filling mass. After step S3, the process proceeds to step S4.

In step S4, when the EGR mass M1 is smaller than the EGR mass M2, a negative determination is made, and the process proceeds to step S9 and further to step S10. That is, even when the fuel injection is restarted, as long as the upstream EGR passage 41a is not filled with the exhaust gas, the fresh air remaining in the upstream EGR passage 41a passes through the EGR valve 43, so that the EGR rate is estimated to be zero. After step S10, the process ends temporarily.

In the subsequent routine, the same process is repeated until the upstream EGR passage 41a is not filled with the exhaust gas. When the upstream EGR passage 41a is filled with the exhaust gas, an affirmative determination is made in step S4, and the process proceeds to step S5.

In step S5, the controller 50 makes an exhaust gas filling determination. The exhaust gas filling determination is a determination that the upstream EGR passage 41a is filled with the exhaust gas, and the EGR rate in the EGR valve 43 increases after the upstream EGR passage 41a is filled with the exhaust gas after the EGR is restarted. After step S5, the process proceeds to step S6.

In step S6, the controller 50 determines whether the limited EGR rate is higher than the target EGR rate. As described above, the limited EGR rate is obtained by adding the change limited amount to the EGR rate, and is smaller than the target EGR rate immediately after the negative determination is switched to an affirmative determination in step S4. Therefore, in this case, a negative determination is made in step S6, and the process proceeds to step S8.

In step S8, the controller 50 determines the EGR rate as the limited EGR rate. As a result, when the limited EGR rate is equal to or less than the target EGR rate, the EGR rate in the EGR valve 43 is estimated to be the limited EGR rate. After step S8, the process ends temporarily.

In the subsequent routine, the same process is repeated when the limited EGR rate is equal to or less than the target EGR rate. Then, when the limited EGR rate becomes higher than the target EGR rate, an affirmative determination is made in step S6, and the process proceeds to step S7.

In step S7, the controller 50 determines the EGR rate as the target EGR rate. As a result, when the limited EGR rate becomes higher than the target EGR rate, the EGR rate in the EGR valve 43 is estimated to be the target EGR rate. After step S7, the process ends temporarily.

In this flowchart, in step S4, step S5, and step S8, a gas replacement state by the exhaust gas and the fresh air in the upstream EGR passage 41a is determined. Further, in step S7, step S8 and step S10, the EGR rate is estimated based on a result of the determination. Further, by repeatedly executing the processes of step S1, step S2, step S4, and step S9, it is determined whether fresh air replacement is being executed according to the execution time of the fuel cut. When a negative determination in made in step S1 and then the process proceeds to step S10, the EGR rate after the EGR is restarted is estimated to be zero.

Figure 5:
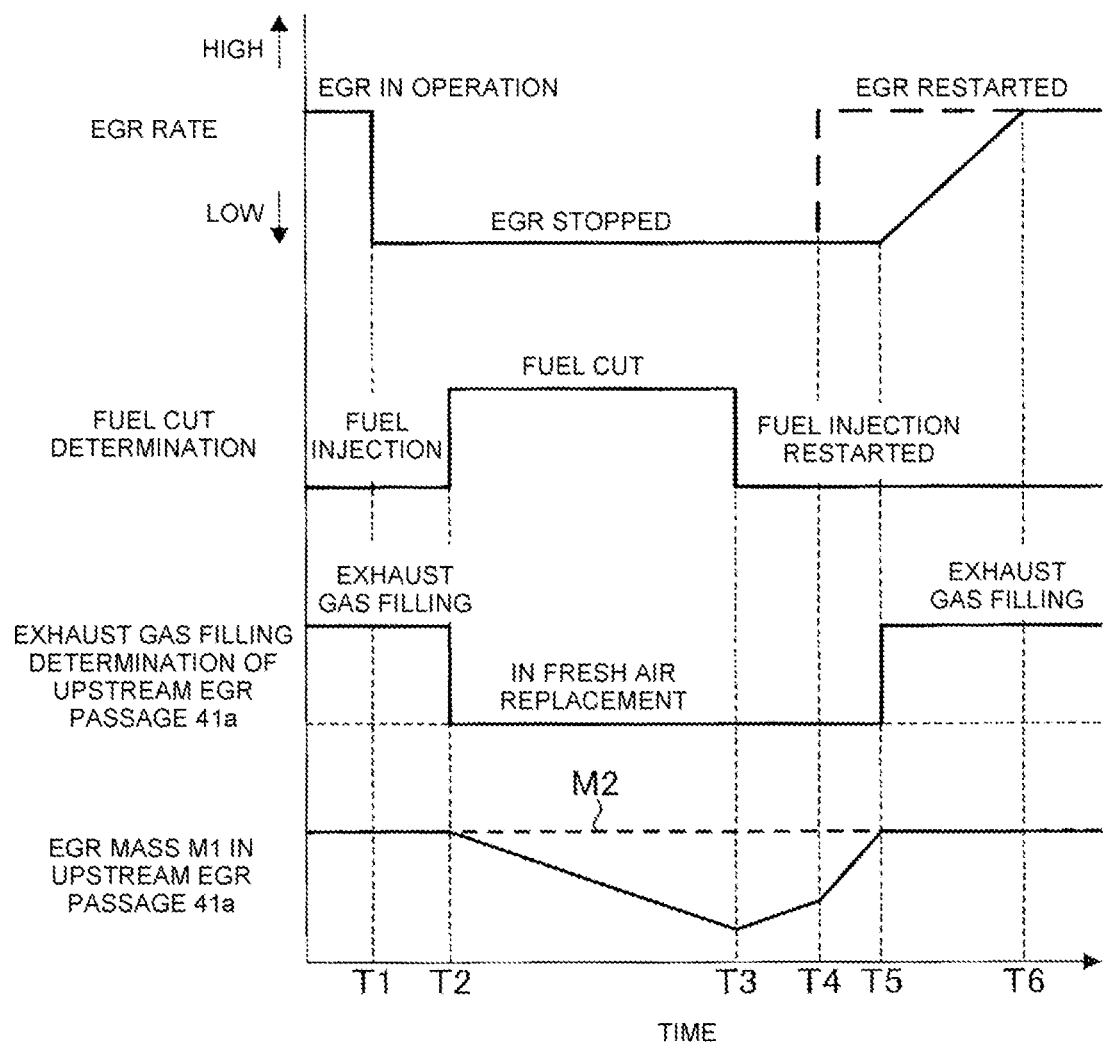
FIG. 5 is a diagram showing an example of a timing chart.

FIG. 5 is a diagram showing an example of a timing chart corresponding to the flowchart shown in FIG. 4. An EGR rate shown by a broken line indicates the target EGR rate. The EGR is stopped at a timing T1. As a result, the EGR valve 43 is fully closed from the timing T1.

At a timing T2, the fuel cut is started. As a result, from the timing T2, the inside of the upstream EGR passage 41a begins to be replaced with the fresh air due to the leakage of the exhaust gas from the gap of the EGR valve 43. In other words, the upstream EGR passage 41a is being replaced with the fresh air. From the timing T2, the EGR mass M1 begins to decrease and becomes smaller than the EGR mass M2. That is, the inside of the upstream EGR passage 41a is not filled with the exhaust gas due to inflow of the fresh air.

The EGR mass M1 that starts to decrease from the timing T2 decreases with the same inclination until a timing T3 when the fuel injection is restarted. The fresh air replacement mass is set in advance based on the gap of the EGR valve 43 as described above. Therefore, a magnitude of the inclination of the change in the EGR mass M1 between the timing T2 and the timing T3 indicates the fresh air replacement mass.

At the timing T3, the fuel cut is stopped and the fuel injection is restarted. Therefore, from the timing T3, the exhaust gas starts to be filled in the upstream EGR passage 41a due to the leakage of the fresh air from the gap of the EGR valve 43. As a result, the EGR mass M1 begins to increase from the timing T3.

The EGR mass M1 that starts to increase from the timing T3 increases with the same inclination until a timing T4 when the EGR is restarted. After the fuel injection is restarted, the EGR filling mass before the EGR is restarted is set in advance based on the gap of the EGR valve 43 as described above. Therefore, a magnitude of the inclination of the change in the EGR mass M1 between the timing T3 and the timing T4 indicates such an EGR filling mass.

The EGR is restarted at the timing T4. As a result, the EGR valve 43 is opened, and the EGR mass M1 begins to increase in a larger degree than that before the EGR valve 43 is opened. The EGR mass M1 that starts to increase from the timing T4 increases with the same inclination until a timing T5 where the exhaust gas filling determination is made.

The EGR filling mass after the EGR is restarted is set based on the above target EGR mass flow rate, which therefore is a flow rate of the EGR gas flowing through the upstream EGR passage 41*a*. A magnitude of the inclination of the change in the EGR mass M1 between the timing T4 and the timing T5 indicates such an EGR filling mass.

A period between the timing T4 and the timing T5 indicates a period until the EGR rate starts to increase after the EGR is restarted. The period is set to be shorter when the flow rate of the EGR gas flowing through the upstream EGR passage 41*a* is large than when the flow rate is small. This is because the larger the flow rate of the EGR gas after the EGR is restarted, the faster the upstream EGR passage 41*a* is filled with the exhaust gas.

Such a period can be set by setting the EGR filling mass after the EGR is restarted based on the target EGR mass flow rate, which therefore is the flow rate of the EGR gas flowing through the upstream EGR passage 41*a*. The EGR filling mass after the EGR is restarted can be set in advance using map data according to the flow rate of the EGR gas flowing through the upstream EGR passage 41*a*. In the flowchart shown in FIG. 4 described above, the process of step S3 corresponds to the setting of such a period.

Since the EGR mass M1 is smaller than the EGR mass M2 from the timing T2 to the timing T5, the EGR rate is set to zero, and the EGR mass M1 becomes the EGR mass M2 at the timing T5. As a result, the exhaust gas filling determination of the upstream EGR passage 41*a* is made.

As described above, the EGR mass M1 is set based on the target EGR mass flow rate. Therefore, the above exhaust gas filling determination is made based on the flow rate of the EGR gas flowing through the upstream EGR passage 41*a*. In the flowchart shown in FIG. 4 described above, the process of step S4 following step S3 and the process of step S5 correspond to making such an exhaust gas filling determination.

From the timing T5, the EGR rate is set as the limited EGR rate according to the exhaust gas filling determination, and the EGR rate starts to increase. The EGR rate gradually increases from the timing T5 by the limited change amount. Further, the EGR rate increases with the same inclination until a timing T6 when the target EGR rate is reached. Therefore, a magnitude of the inclination of the change in the EGR rate between the timing T5 and the timing T6 indicates the limited change amount.

A degree of increase in the EGR rate from the timing T5 after the EGR is restarted is set to be larger when the flow rate of the EGR gas is large than that when the flow rate is small. This is because the exhaust gas is actually diluted with the fresh air in the process of filling the upstream EGR passage 41*a* with the exhaust gas from the timing T4 when the EGR is restarted, and because the larger the flow rate of the EGR gas, the shorter a dilution time, and the more difficult it is for the exhaust gas to be diluted.

Such a degree of increase can be set by setting the limited change amount based on the target EGR mass flow rate, which therefore is the flow rate of the EGR gas flowing through the upstream EGR passage 41*a*. The limited change amount can be set in advance using map data according to the flow rate of the EGR gas flowing through the upstream EGR passage 41*a*.

At the timing T6, the EGR rate reaches the target EGR rate. Therefore, the EGR rate is estimated to be the target EGR rate from the timing T6.

Next, main functions and effects of the present embodiment will be described.

In the EGR estimation method for the internal combustion engine 1 according to the present embodiment, the EGR rate in the intake and exhaust system 10, 20 of the internal combustion engine 1 is estimated. The intake and exhaust system 10, 20 of the internal combustion engine 1 includes the intake system 10, the exhaust system 20, and the EGR device 40 including the EGR passage 41 and the EGR valve 43. The EGR estimation method for the internal combustion engine 1 includes determining the gas replacement state by the exhaust gas and the fresh air in the upstream EGR passage 41*a* when the fuel cut of the internal combustion engine 1 is started and the EGR valve 43 is fully closed, and estimating the EGR rate based on a result of the determination.

According to such a method, the gas replacement state in the upstream EGR passage 41*a* can be reflected in estimating the EGR rate. Therefore, when the fuel cut is started and the EGR valve 43 is fully closed, even when the exhaust gas inside of the upstream EGR passage 41*a* is replaced with the fresh air, a more accurate EGR rate can be estimated.

In the present embodiment, whether the fresh air replacement is being executed is determined according to the execution time of the fuel cut, that is, whether the upstream EGR passage 41*a* is not filled with the exhaust gas due to the inflow of the fresh air is determined.

According to such a method, the gas replacement state in the upstream EGR passage 41*a* where the exhaust gas is replaced with the fresh air by leaking the exhaust gas through the gap of the EGR valve 43 during the fuel cut can be appropriately determined. Therefore, it is possible to estimate the EGR rate more accurately.

In the present embodiment, when it is determined that the inside of the upstream EGR passage 41*a* is not filled with the exhaust gas due to the inflow of the fresh air, the EGR rate after the EGR is restarted is estimated to be zero.

According to such a method, the EGR rate is estimated to be zero in light of that the fresh air remaining in the upstream EGR passage 41*a* first flows into the EGR valve 43 after the EGR is restarted, so that the EGR rate can be estimated more accurately.

In the present embodiment, after the fuel injection of the internal combustion engine 1 is restarted, it is determined whether the inside of the upstream EGR passage 41*a* is replaced with the exhaust gas based on the flow rate of the EGR gas flowing through the upstream EGR passage 41*a*.

According to such a method, it is possible to appropriately determine whether the inside of the upstream EGR passage 41*a* is replaced with the exhaust gas, so that the EGR rate after the fuel injection is restarted can be appropriately estimated.

In the present embodiment, the period until the start of increase in the EGR rate after the EGR is restarted is shorter when the flow rate of the EGR gas flowing through the upstream EGR passage 41*a* is large than that when the flow rate is small.

According to such a method, the EGR rate can start to increase at an appropriate timing after the EGR is restarted in light of that the larger the flow rate of the EGR gas after the EGR is restarted, the earlier the upstream EGR passage 41a is filled with the exhaust gas.

In the present embodiment, the degree of increase in the EGR rate after the EGR is restarted is larger when the flow rate of the EGR gas flowing through the upstream EGR passage 41a is large than that when the flow rate is small.

According to such a method, the EGR rate can be increased in an appropriate degree after the EGR is restarted in light of that the larger the flow rate of the EGR gas after the EGR is restarted, the more difficult it is for the exhaust gas to be diluted.

Although the embodiment of the present invention has been described above, the above-mentioned embodiment is merely a part of application examples of the present invention, and does not mean that the technical scope of the present invention is limited to the specific configurations of the above-mentioned embodiment.

For example, in the above embodiment, the case of estimating the EGR rate in the EGR valve 43 is described. However, the estimated EGR rate may be an EGR rate at a predetermined position from the downstream EGR passage 41b to the internal combustion engine 1, such as the EGR rate of the gas flowing into the cylinder of the internal combustion engine 1. Such an EGR rate can be estimated, for example, by correcting the timing at which the EGR gas arrives and the EGR rate according to the distance from the EGR valve 43, the inflow, and the like.

For example, in the above embodiment, the EGR estimation method for the internal combustion engine 1 and the case where the EGR estimation device for the internal combustion engine 1 is implemented by the controller 50 is described. However, the EGR estimation method for the internal combustion engine 1 and the EGR estimation device for the internal combustion engine 1 may be implemented by a plurality of controllers instead of a single controller 50.

The invention claimed is:

1. An exhaust gas recirculation (EGR) estimation method for estimating an EGR rate in an intake and exhaust system of an internal combustion engine, the EGR estimation method comprising:
    providing the intake and exhaust system, which comprises:
        an intake passage that is connected to the internal combustion engine,
        an exhaust passage that is connected to the internal combustion engine,
        an EGR valve in which a gap occurs even when the EGR valve is fully closed, due to a structure of the EGR valve, and
        an EGR passage comprising an upstream EGR passage that connects the exhaust passage to the EGR valve, and a downstream EGR passage that connects the EGR valve to the intake passage;
    when a fuel cut of the internal combustion engine is started with the EGR valve fully closed:
        maintaining the EGR valve fully closed during the execution of the fuel cut of the internal combustion engine, and
        during the execution of the fuel cut of the internal combustion engine and/or after fuel injection of the internal combustion engine is restarted, determining a gas replacement state by exhaust gas and fresh air in the upstream EGR passage; and
    estimating the EGR rate based on a result of the determination of the gas replacement state.

2. The EGR estimation method for an internal combustion engine according to claim 1, wherein:
    whether an inside of the upstream EGR passage is not filled with the exhaust gas due to inflow of the fresh air is determined according to an execution time of the fuel cut.

3. The EGR estimation method for an internal combustion engine according to claim 2, wherein:
    when it is determined that the upstream EGR passage is not filled with the exhaust gas due to the inflow of the fresh air, the EGR rate after EGR is restarted is estimated to be zero.

4. The EGR estimation method for an internal combustion engine according to claim 1, wherein:
    after fuel injection of the internal combustion engine is restarted, it is determined whether the inside of the upstream EGR passage is replaced with the exhaust gas based on a flow rate of EGR gas flowing through the upstream EGR passage.

5. The EGR estimation method for an internal combustion engine according to claim 4, further comprising:
    setting a period until the EGR rate after the EGR is restarted starts to increase to be shorter as the flow rate of the EGR gas increases.

6. The EGR estimation method for an internal combustion engine according to claim 4, further comprising:
    setting a degree of increase in the EGR rate after the EGR is restarted to be larger as the flow rate of the EGR gas increases.

7. The EGR estimation method for an internal combustion engine according to claim 1, wherein:
    the gas replacement state is determined based on at least an amount of exhaust gas or an amount of fresh air leaking from the gap of the EGR valve.

8. An exhaust gas recirculation (EGR) estimation device for estimating an EGR rate in an intake and exhaust system, the intake and exhaust system comprising:
    an intake passage that is connected to the internal combustion engine,
    an exhaust passage that is connected to the internal combustion engine,
    an EGR valve in which a gap occurs even when the EGR valve is fully closed, due to a structure of the EGR valve, and
    an EGR passage comprising an upstream EGR passage that connects the exhaust passage to the EGR valve, and a downstream EGR passage that connects the EGR valve to the intake passage,
    the EGR estimation device comprising:
    a determination control unit configured to, when a fuel cut of the internal combustion engine is started the EGR valve fully closed:
        maintain the EGR valve fully closed during the execution of a fuel cut of the internal combustion engine, and
        during the execution of the fuel cut of internal combustion engine and/or after fuel injection of the internal combustion engine is restarted, determine a gas replacement state by exhaust gas and fresh air in the upstream EGR passage; and
    an estimation control unit configured to estimate the EGR rate based on a result of the determination of the gas replacement state.

* * * * *